Oct. 24, 1961 N. W. GALLAWAY 3,005,353
MEANS CONNECTING DOUBLE PITMAN TO PUMP UNIT EQUALIZER BEAM
Filed Aug. 5, 1960

NORRIS W. GALLAWAY
INVENTOR.

BY

ATTORNEY

United States Patent Office 3,005,353
Patented Oct. 24, 1961

1

3,005,353
MEANS CONNECTING DOUBLE PITMAN TO PUMP UNIT EQUALIZER BEAM
Norris W. Gallaway, Fort Worth, Tex., assignor to American Manufacturing Company of Texas, Fort Worth, Tex., a corporation of Texas
Filed Aug. 5, 1960, Ser. No. 47,689
3 Claims. (Cl. 74—41)

This invention relates to walking beam type pumping units and has reference to means connecting an equalizer beam to a double pitman and tail bearing thereof.

In large pumping units which utilize twin cranks and a pair of corresponding pitmans to reciprocate a walking beam, it has heretofore been the usual practice to connect an equalizer beam by a ball joint or other universal coupling to the rearward part of the walking beam and to pivotally connect the equalizer beam by hinge type joints at its opposite ends to the pitmans. The primary purpose of these pivotal joints is to permit running angular adjustment of the pitmans to departures of the equalizer beam from a horizontal disposition. A slight mismatch in the alignment of any of the coacting components which translate angular displacement of the crank shaft into the reciprocating motion of the polished rod leads to excessive stress and wear on bearings and power losses in the pumping cycle unless means compensating for misalignment are incorporated in the construction of the pumping unit. In a perfectly constructed pumping unit the equalizer beam would be maintained in constant perpendicularity with the walking beam and pitmans; the effects of improper alignment arising from inherent limitations in manufacturing techniques may be expressed as deviations from this ideal relationship. If the effective length of one of the cranks, for instance, is slightly longer than the other, the equalizer beam would be angularly and periodically displaced about a point in a plane immediate its ends and will twice pass through a perpendicular relationship with the pitmans during each pumping cycle. If one of the pitmans is slightly longer than the other, the equalizer beam will form a constant angle with the pitmans in a consistent departure from the perpendicular. If the cycles of the two cranks are slightly out of phase with one another there will be a displacement of the equalizer beam which intermittently varies its relationship with the walking beam as well as the pitmans. The use of pitman pins with a universal type tail bearing adds appreciatively to the cost of fabricating a pumping unit and in some cases leads to the development of backlash or sideslap in the pumping motion. Pitman pins, in particular, require regular lubrication and constitute wearing parts which after extensive use are subject to a reduction in diameter such that play develops in their action, and resulting percussive forces are transmitted to the motion of the walking beam. As a practical matter, the necessary angular displacement between a pitman and the equalizer beam is very slight in view of the manufacturing tolerances which may be adopted without economic penalties. Wear on the pitman pins results not from large angular displacements between the pitmans and the equalizer beam but rather from the large number of small angular displacements involved in extended use of the pumping unit. Resilient joints using rubber or other compressible materials have been used instead of pitman pins to avoid wear and the necessity for lubrication, but these materials are generally subject to deterioration through weathering and tend to generate a dwell in the cycle of the walking beam at the opposite extremes of its displacement.

Accordingly, an object of the present invention is to provide a means connecting pitmans to an equalizer beam and wherein such connections are not subject to wear.

A further object of the invention is to provide connections between pitmans and an equalizer beam and which connections do not require lubrication or maintenance.

Another object of the invention is to provide construction for a pumping unit wherein compensation for misalignment may be incorporated without the use of a universal type tail bearing.

A further object of the invention is to provide compensating means for a pumping unit and which means tends to minimize the net effect of misalignment.

A particular object of the invention is to provide an efficient and economical method of connecting an equalizer beam to the pitmans and walking beam of a pumping unit.

Another object of the invention is to provide means whereby the detrimental effects of misalignment may be partially absorbed as non-detrimental flexure in various component parts of a pumping unit.

These and other objects will become apparent from the following description and the accompanying drawing wherein.

Figure 1:
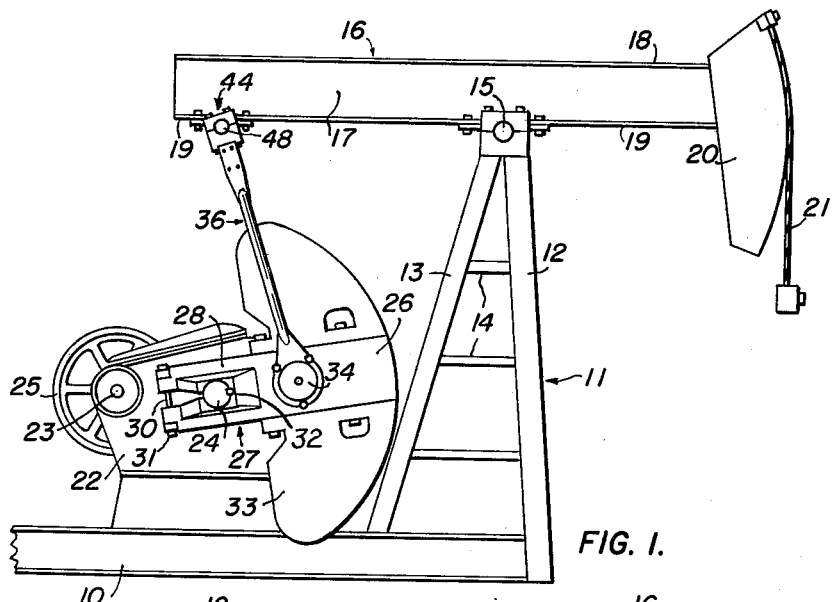
FIGURE 1 is a side elevational view of a pumping unit embodying the features of the present invention.
Figures 2, 3:
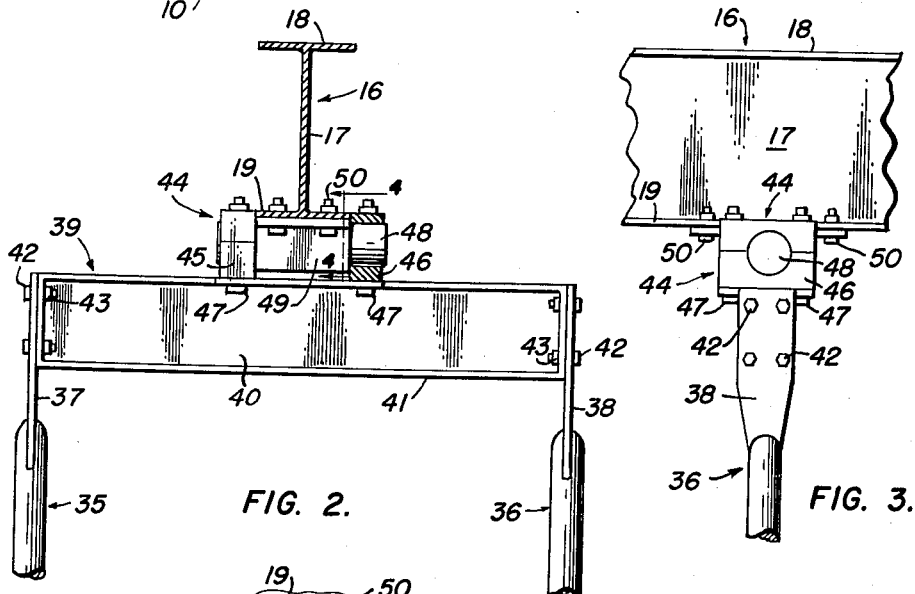
FIGURE 2 is an enlarged and fragmentary rear elevational and partially sectional view of the pitmans, equalizer beam, tail bearing and walking beam of the pumping unit illustrated in FIGURE 1.
FIGURE 3 is a side elevational view of the components illustrated in FIGURE 2.
Figure 4:
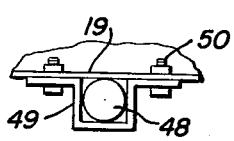
FIGURE 4 is a sectional view taken along line 4—4 in FIGURE 2.

In the drawing, the base or platform 10 of a pumping unit rests upon and is supported by a suitable foundation (not shown) and is horizontally disposed. A Samson post 11 constructed of upwardly converging forward and rear legs 12 and 13 having rigid cross braces 14 extending therebetween, is secured at its lower end to the base 10 and supports a saddle bearing 15 by which a walking beam 16 is pivotally supported for displacement in a vertical plane. The walking beam 16 includes a vertical web 17 coextensive therewith and integral upper and lower flanges 18 and 19 lying perpendicular to the web along the upper and lower edges thereof. A mule head 20 is secured to the forward end of the walking beam 16 and carries a bridle 21 which engages and supports the polished rod of a sucker rod string (not shown) in the well.

A gear reducer box 22 is mounted on the base 10 rearwardly of the Samson post 11 and includes a driven shaft 23 and a crank shaft 24, each disposed perpendicularly to the plane of displacement of the walking beam 16. A driven sheave 25 is coactively mounted on the driven shaft 23 exteriorly of the gear reducer box 22 and is adapted to be engaged and rotated by a power unit (not shown). Opposite ends of the crank shaft 24 project exteriorly of the gear reducer box 22 and extend equidistantly from the plane of displacement of the web 17 of the walking beam 16. Twin cranks 26 are respectively perpendicularly connected to the crank shaft 24 at the opposite ends thereof and the two cranks are there identically oriented. Each crank 26 is attached to the crank shaft 24 by a split block 27 integrally constructed with its non-projecting end and having opposite members 28 and 29 urged into frictional contact with the crank shaft 24 by a bolt 30 which extends through the opposite members of the split block 27 rearwardly of the crank shaft with respect to the projecting portion of the crank 26 and threadedly engages a nut 31 exteriorly positioned with respect to the crank. A key 32 positioned within opposed corresponding keyways in the crank 26 and crank shaft 24 at each side of the gear reducer box 22 orients one crank with respect to the other. Identical counter balances 33 are adjustably attached to and carried by the projecting ends of the cranks 26. A crank pin 34 is mounted on each crank 26 perpendicularly to its plane of rotation and each crank pin projects outwardly of its crank with respect to the gear reducer box 22. Pitmans 35 and 36 are respectively attached to the crank pins 34, one end of each pitman 35 and 36 being journaled thereto. Generally, the pitmans 35 and 36 are of cylindrical construction, but the upper ends of the pitmans are constructed as straps 37 and 38 of spring steel having their largest surfaces disposed parallel with the planes of rotation of the cranks 26. An equalizer beam 39, constructed as a rectangular web 40 having a peripheral flange 41 perpendicularly and contiguously secured to its edges, extends between the straps 37 and 38 of pitmans 35 and 36, and bolts 42 extending through each of the straps and the flange 41 at the ends of the equalizer beam 39 are engaged by nuts 43 which secure the upper portion of each strap to an end of the equalizer beam. A tail bearing 44 pivotally connects the equalizer beam 39 to the walking beam 16; it should be noted that this bearing is not of the usual universal type but is confined to a single direction of angular displacement which is parallel with the web 17 of the walking beam. The tail bearing 44, as illustrated, is comprised of a pair of clamps 45 and 46, spaced from one another and attached by bolts 47 to the flange 41 on the upper edge of the equalizer beam 39 at positions respectively located equidistantly from the ends thereof, which engage opposite ends of a shaft 48 having its axis parallel with the axes of the crank pins 34. A flanged box 49 positioned adjacently about the shaft 48 between the clamps 45 and 46, is secured by bolts 50 to the lower flange 19 of the walking beam 16.

In operation, flexure of the straps 37 and 38 on the upper ends of the pitmans 35 and 36 permits angular displacement of the equalizer beam 39 relative to the pitmans, but such flexure is confined to the common plane defined by each pitman and the equalizer beam. The great width of each strap 37 and 38 as compared to its thickness resists bending of the straps and displacement of the pitmans 35 and 36 with respect to the equalizer beam 39 in a plane parallel with the planes of rotation of the cranks 26. In other words, the bending modulus of each strap 37 and 38 is minimum in a direction perpendicular to the largest surface thereof and is relatively large in the direction of the width of the strap. Each strap 37 and 38 permits deviation from a perpendicular relationship between its pitman 35 and 36 and the equalizer beam 39 but has a small order of inherent resistance to flexure which prevents sideslap or lost motion in the pumping cycle. Forces of tension and compression between the equalizer beam 39 and each pitman 35 and 36 are transmitted through the lengths of the straps 37 and 38 along lines of minimum flexibility so that dwell is not imparted to the cycle of the walking beam 16. It should be noted that flexure of the straps 37 and 38 is concentrated in an area between the lower flange 41 of the equalizer beam 39 and the upper end of the cylindrical portion of each pitman 35 and 36; concentration in this limited area at the upper end of each pitman gives the described connection of the pitman to the equalizer beam 39 a characteristic similar to a pivotal connection but the connection is not subject to frictional wear unless the yield or fatigue limits of the strap are approached. It has been theoretically ascertained and experimentally confirmed that straps 37 and 38 having dimensions which vary according to the metal from which they are made and the load requirements and dimensional tolerances of the pumping units with which they are to be used may be so constructed as to permit the required flexure without approaching the yield fatigue limits of the metal. It will be apparent that lubrication of such a joint is not necessary.

The width of the web 40 of the equalizer beam 39 is great as compared to the width of its flange 41 and the bending modulus of the equalizer beam is, therefore, directionally selective in that there is a minimum of resistance to bending in a direction perpendicular to the surfaces of the web and a maximum of resistance in a direction parallel with the principal surfaces thereof. The pivotal connection of the equalizer beam 39 to the walking beam 16 permits relatively free displacement of the equalizer beam in a direction parallel with the planes of rotation of the cranks 26 but is rigid in all other directions so that resistance of the equalizer beam and the tail bearing 44 to flexure or displacement in a direction perpendicular to the larger surfaces of the upper and lower portions of the flange 41 of the equalizer beam transmits a force in that direction to the walking beam 16 as a twisting moment about the center line of the web 17 of the walking beam. Empirically, it has been found that a slight twist in the rearward end of the walking beam 16 has a negligible effect upon the saddle bearing 15 and the mule head 20 of the walking beam; hence, displacement of the equalizer beam 44 in a plane perpendicular to the center line of the web 17 of the walking beam may be absorbed as a twist about the length of the walking beam without detrimental effects.

If the effective length of one crank 26 is longer than the other, compensation for this inequality is accomplished in the present invention through flexure of the straps 37 and 38 on the upper end of the pitmans 35 and 36 and a slight twist in the rearward portion of the walking beam 16; during one pumping cycle the walking beam is slightly twisted first in one direction and then the other, and as the equalizer beam 39 twice passes through a perpendicular relationship with the pitmans 35 and 36, each is alternately flexed toward opposite sides of the plane of rotation of the cranks 26. If there is a phase difference in the cranks 26 deviations from perpendicularity between the equalizer beam 39 and the walking beam 16 is partially absorbed as flexures in the equalizer beam in a direction perpendicular to the web 40 thereof. Inequality in the length of the pitmans 35 and 36 results in a slight and constant flexure in the straps 37 and 38 as well as a constant twist in the walking beam 16. Since some degree of all the described misalignments may be expected within the normal operation of a pumping unit, a combination of the described effects within limits determined by the dimensional tolerances of the equipment will usually be present. Twisting about the center line of the walking beam instead of the usual displacement about a universal type tail bearing tends to keep the pitmans 35 and 36 parallel with one another and minimizes some of the effects of misalignments by foreshortening the effective length of the longest crank and pitman combination. Extensive tests with purposely and extremely misaligned pumping units have demonstrated that the invention provides an effective compensating means which does not result in detrimental stresses or power losses of the pumping unit and which entails both functional and economic advantages.

The invention is not limited to exemplary construction herein shown and described but may be made in various ways within the scope of the appended claims.

What is claimed is:

1. In a pumping unit including a walking beam and twin cranks: an equalizer beam pivotally connected to said walking beam, a pair of pitmans respectively pivotally attached to said cranks and extending therefrom, flexible straps respectively attached to the extending ends of said pitmans and extending therefrom in alignment therewith and having their largest surfaces disposed parallel with the plane of displacement of said walking beam, and means rigidly securing the extending ends of said straps to opposite ends of said equalizer beam.

2. In a pumping unit including a walking beam and twin cranks: an equalizer beam pivotally attached to said walking beam for angular displacement about an axis normally parallel with the axis of displacement of said walking beam, a pair of rigid pitmans respectively pivotally attached to said cranks and extending therefrom, straps of spring metal respectively attached to the extending ends of said pitmans and extending therefrom in alignment therewith and having their largest surfaces disposed perpendicularly to the axis of displacement of said equalizer beam, and means rigidly securing the extending ends of said straps to opposite ends of said equalizer beam.

3. In a pumping unit including a walking beam and twin cranks; an equalizer beam of limited flexibility constructed in symmetrical shape with respect to a plane intermediate and perpendicular to its length and having a width which is less than its length and a thickness which is less than its width, means pivotally attaching said equalizer beam to said walking beam about an axis parallel with the axis of angular displacement of said walking beam and with the length of said equalizer beam parallel with its pivotal axis and with the thickness of said equalizer beam perpendicular to its pivotal axis, a pair of straps of spring metal respectively rigidly attached to opposite ends of said equalizer beam and projecting perpendicularly outwardly of the pivotal axis thereof and having their largest surfaces disposed perpendicularly to the length of said equalizer beam, a pair of pitmans respectively rigidly attached to said straps at positions thereon spaced from said attachments of said straps to said equalizer beam, and means respectively pivotally connecting said pitmans to said cranks.

References Cited in the file of this patent

UNITED STATES PATENTS

| | | |
|---|---|---|
| 2,001,033 | Matherne | May 14, 1935 |
| 2,023,554 | Slonneger | Dec. 10, 1935 |
| 2,079,276 | Bloss | May 4, 1937 |
| 2,408,200 | De La Mater | Sept. 24, 1946 |
| 2,515,360 | Vail | July 18, 1950 |

FOREIGN PATENTS

| | | |
|---|---|---|
| 17,537 | Netherlands | July 15, 1927 |